(12) United States Patent
Kohno et al.

(10) Patent No.: US 12,446,135 B2
(45) Date of Patent: Oct. 14, 2025

(54) LIGHT CONTROL DEVICE THAT PERFORMS LIGHT CONTROL OF LIGHTING DEVICE, LIGHT CONTROL SYSTEM, AND CONTROL METHOD

(71) Applicant: CANON KABUSHIKI KAISHA, Tokyo (JP)

(72) Inventors: Toru Kohno, Kanagawa (JP); Takayuki Shu, Kanagawa (JP); Yuhei Hattori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/184,772

(22) Filed: Mar. 16, 2023

(65) Prior Publication Data

US 2023/0309208 A1    Sep. 28, 2023

(30) Foreign Application Priority Data

Mar. 24, 2022   (JP) ................................. 2022-048667

(51) Int. Cl.
| | |
|---|---|
| *H05B 47/115* | (2020.01) |
| *H05B 45/00* | (2022.01) |
| *H05B 45/325* | (2020.01) |
| *H05B 45/395* | (2020.01) |
| *H05B 47/19* | (2020.01) |

(52) U.S. Cl.
CPC ................................. *H05B 47/115* (2020.01)

(58) Field of Classification Search
CPC .... H05B 47/19; H05B 47/175; H05B 47/105; H05B 47/199; H05B 45/20; H05B 47/125
See application file for complete search history.

(56) References Cited

U.S. PATENT DOCUMENTS

| | | | |
|---|---|---|---|
| 2012/0143357 A1* | 6/2012 | Chemel ................... | G01D 18/00 702/128 |
| 2012/0235579 A1* | 9/2012 | Chemel ................... | F21V 15/01 315/152 |
| 2018/0012137 A1* | 1/2018 | Wright ............... | G05B 13/0265 |
| 2019/0182927 A1* | 6/2019 | Steiner ................... | G06V 40/20 |

(Continued)

FOREIGN PATENT DOCUMENTS

JP         2011-528133 A       11/2011

*Primary Examiner* — Wei (Victor) Y Chan
(74) *Attorney, Agent, or Firm* — Cowan, Liebowitz & Latman, P.C.

(57) ABSTRACT

A light control system including an image capturing apparatus having an image capturing section for acquiring an image of an object, a lighting device having a light emitting section, and a light control device. The image capturing apparatus includes a communication section that communicates with the lighting device and the light control device, and a controller that detects at least one information of an object luminance, a shadow contrast value, and an outline contrast value, from the acquired object image. The lighting device includes a communication section that communicates with the image capturing apparatus, and a controller that sets a light amount of the light emitting section. The light control device includes a communication section that communicates with the image capturing apparatus, and a controller that performs light control of the lighting device according to the detected information and a role of the lighting device.

10 Claims, 10 Drawing Sheets

(56) References Cited

U.S. PATENT DOCUMENTS

2020/0052997 A1\* 2/2020 Ramanathan ........... H04L 45/20
2023/0180371 A1\* 6/2023 Henderson ......... H05B 47/1965
                                                                                   315/363

\* cited by examiner

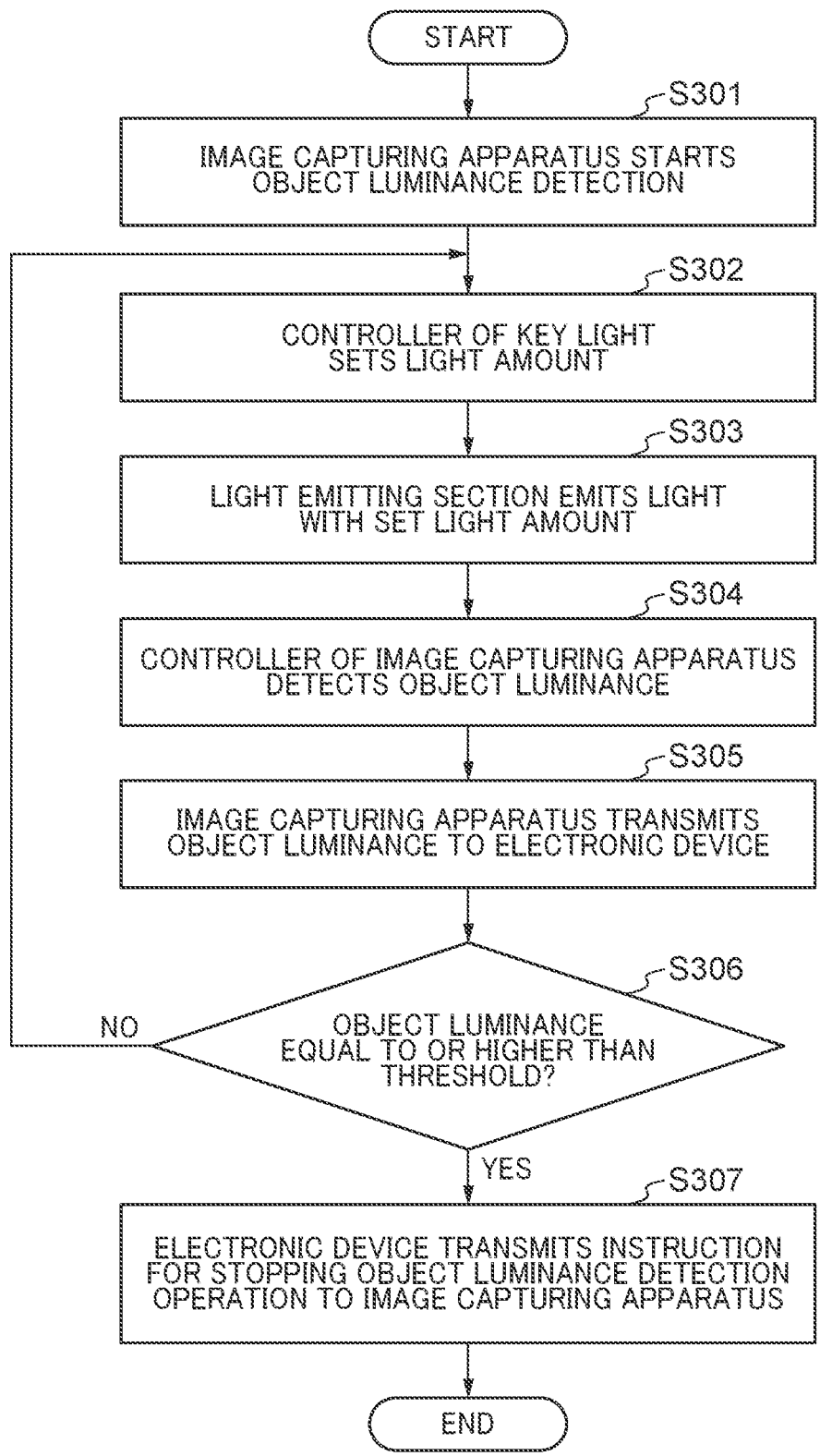

LIGHT CONTROL DEVICE THAT PERFORMS LIGHT CONTROL OF LIGHTING DEVICE, LIGHT CONTROL SYSTEM, AND CONTROL METHOD

BACKGROUND OF THE INVENTION

Field of the Invention

The present invention relates to a light control device, a light control system, and a control method, and more particularly to a light control device that performs light control of a lighting device, a light control system, and a control method.

Description of the Related Art

Conventionally, in a general lighting technique using at least one lighting device, the role of each lighting device is predetermined in most cases. Therefore, each lighting device is required to properly adjust the amount of light in accordance with its role. For example, a front light (key light) is a lighting device having the role of determining an object luminance, and a fill light is a lighting device having the role of filling in shadows created by the front light (key light). Further, a back light is a lighting device having the role of causing the outline of an object to stand out. That is, the amount of light emitted from each lighting device used for lighting an object is adjusted according to the role of the lighting device, i.e. which of the front light, the fill light, and the back light, the light device is used for.

For example, Published Japanese Translation of PCT Internal Publication (Tokuhyo) No. 2011-528133 discloses a method of performing light control of each lighting device based on a relative luminance ratio between a font light (key light) luminance and a back light luminance, detected at an object position.

However, in the conventional technique disclosed in Published Japanese Translation of PCT Internal Publication (Tokuhyo) No. 2011-528133, the light control of each light is performed based only on the relative luminance ratio between the font light (key light) luminance and the back light luminance, and the light control of each light based on an actually obtained image is not performed. Therefore, the light control is sometimes affected by other factors than irradiating light, such as outside light and an object shape, which makes it impossible to control the light amount of each lighting device used for lighting an object to an appropriate light amount.

SUMMARY OF THE INVENTION

The present invention provides a light control device that is capable of providing a light control method based on an actually acquired video, for at least one lighting device, an image capturing apparatus, and a light control system, a control method.

In a first aspect of the present invention, there is provided a light control system that includes an image capturing apparatus having an image capturing section for acquiring an image of an object, and a lighting device having a light emitting section, including at least one processor that executes respective functions of a detection unit configured to detect at least one information of an object luminance, a shadow contrast value, and an outline contrast value, from the image of the object acquired by the image capturing section, a light amount-setting unit configured to set a light amount of the light emitting section, and a light control unit configured to perform light control of the lighting device according to the information detected by the detection unit and a role of the lighting device.

In a second aspect of the present invention, there is provided a light control device that performs light control of a lighting device having a light emitting section, by using an image of an object, which is acquired by an image capturing section for acquiring the image of the object, including at least one processor that executes respective functions of an acquisition unit configured to acquire at least one information of an object luminance, a shadow contrast value, and an outline contrast value, detected from the image of the object acquired by the image capturing section, and a light control unit configured to perform light control of the lighting device according to the information acquired by the acquisition unit and a role of the lighting device.

According to the present invention, it is possible to provide a light control method based on an actually acquired video, for at least one lighting device.

Further features of the present invention will become apparent from the following description of exemplary embodiments (with reference to the attached drawings).

BRIEF DESCRIPTION OF THE DRAWINGS

FIG. 3A is a flowchart of a process performed at T207 in FIG. 2 for executing a key light control operation.

DESCRIPTION OF THE EMBODIMENTS

The present invention will now be described in detail below with reference to the accompanying drawings showing embodiments thereof.

Figure 1:
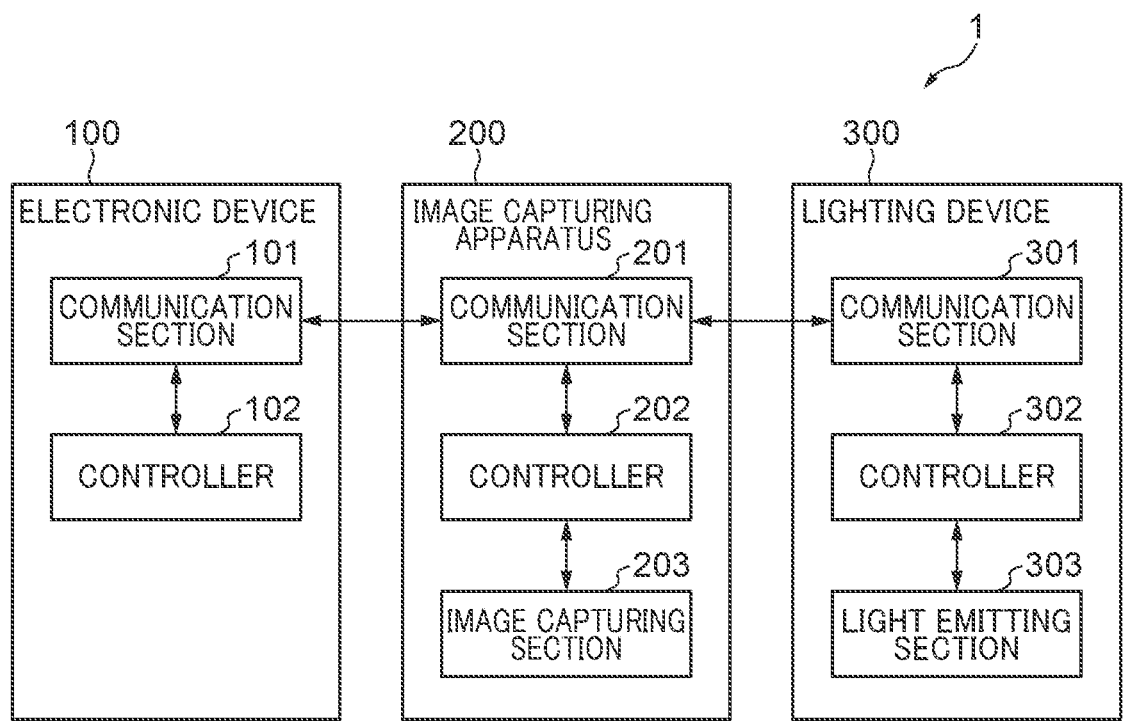
FIG. 1 is a diagram showing the entire configuration of a light control system according to the present invention.

FIG. 1 is a diagram showing the entire configuration of a light control system 1 according to the present invention.

Referring to FIG. 1, the light control system 1 includes an electronic device 100 (light control device), an image capturing apparatus 200 that is capable of communicating with the electronic device 100, and a lighting device 300 that is capable of communicating with the image capturing apparatus 200.

The electronic device 100 includes a communication section 101 and a controller 102.

The image capturing apparatus 200 includes a communication section 201, a controller 202, and an image capturing section 203.

The lighting device 300 includes a communication section 301, a controller 302, and a light emitting section 303.

First, the electronic device 100 will be described.

The communication section 101 (third communication unit) is communicably connected to the communication section 201 of the image capturing apparatus 200. Although in FIG. 1, the communication section 101 is wired connected to the communication section 201, this is not limitative, but the communication section 101 may be wirelessly connected. In a case where the communication section 101 is configured to be wired connected, the communication section 101 has a communication interface to which a cable or the like can be connected. In a case where the communication section 101 is configured to be wireless connected, the communication section 101 has an antenna and a wireless control circuit for performing transmission and reception of a wireless radio signal. Note that the wireless communication method for wireless connection is not limited to a method of using a radio signal, but may be a method of using a light signal, such as infrared ray communication. When the light signal is used, the communication section 101 is only required to have a light emitting section that emits a light signal and a light receiving section that receives a light signal.

The controller 102 (light control unit) performs light control of the lighting device 300 based on a role of the lighting device 300 and at least one information of an object luminance, a shadow contrast value, and an outline contrast value, described hereinafter, which is acquired from the image capturing apparatus 200. Note that the term "shadow contrast value" means a contrast value of a shadow formed on an object by light emission from the lighting device 300.

Next, the image capturing apparatus 200 will be described.

The communication section 201 (first communication unit) is communicably connected to the communication section 101 of the electronic device 100 and the communication section 301 of the lighting device 300, respectively. Although in FIG. 1, the communication section 201 is wired connected to the communication sections 101 and 301, this is not limitative, but the communication section 201 may be wirelessly connected. The communication section 201 is only required to have the same configuration as the communication section 101.

The image capturing section 203 includes an image sensor and acquires an object image. The controller 202 (detection unit) detects at least one information of an object luminance, a shadow contrast value, and an outline contrast value from the object image acquired by the image capturing section 203. Although in FIG. 1, the image capturing apparatus 200 incorporates the one controller 202, the number of incorporated controllers 202 is not limited to one. For example, the image capturing apparatus 200 may be configured to include a plurality of controllers 202, and the controllers 202 may respectively detect an object luminance, a shadow contrast value, and an outline contrast value from the object image acquired by the image capturing section 203.

Next, the lighting device 300 will be described.

The communication section 301 (second communication unit) is communicably connected to the communication section 201 of the image capturing apparatus 200. Although in FIG. 1, the communication section 301 is wired connected to the communication section 201, this is not limitative, but the communication section 301 may be wirelessly connected. The communication section 301 is only required to have the same configuration as the communication section 101.

The controller 302 holds information indicative of a role of the lighting device 300 and light emission operation information associated with the role. Further, the controller 302 (light amount-setting unit) sets, when a user performs an operation for setting a role of the lighting device 300 or when a role instruction is received from the image capturing apparatus 200, a light amount of the light emitting section 303 according to the set or instructed role and executes a light emission operation. Note that the role information of the lighting device 300 is not configured to be stored in the controller 302 of the lighting device 300. For example, the role information of the lighting device 300 may be stored in the controller 102 of the electronic device 100 or the controller 202 of the image capturing apparatus 200.

In a case where the above-described configuration is employed, the lighting device 300 executes the light emission operation associated with the role according to a control instruction from the controller 102 or the controller 202.

The light emitting section 303 is a light source that emits light under the control of the controller 302.

Further, the lighting device 300 is only one in FIG. 1 but may be provided in plurality.

A first embodiment of the present invention will be described below with reference to not only FIG. 1 described above, but also FIGS. 2, 3A, 3B, 4A, 4B, 5A, and 5B.

In the first embodiment, a case will be described where light control in three-point photography, as a generally employed configuration of photography, is performed. That is, in the first embodiment, a description will be given of a case where three lighting devices (hereinafter referred to as the "first to third lighting devices") are provided as the lighting device 300 connected to the image capturing apparatus 200. In the following description, the lighting device 300 will be used as a general term for the first to third lighting devices.

Figure 2:
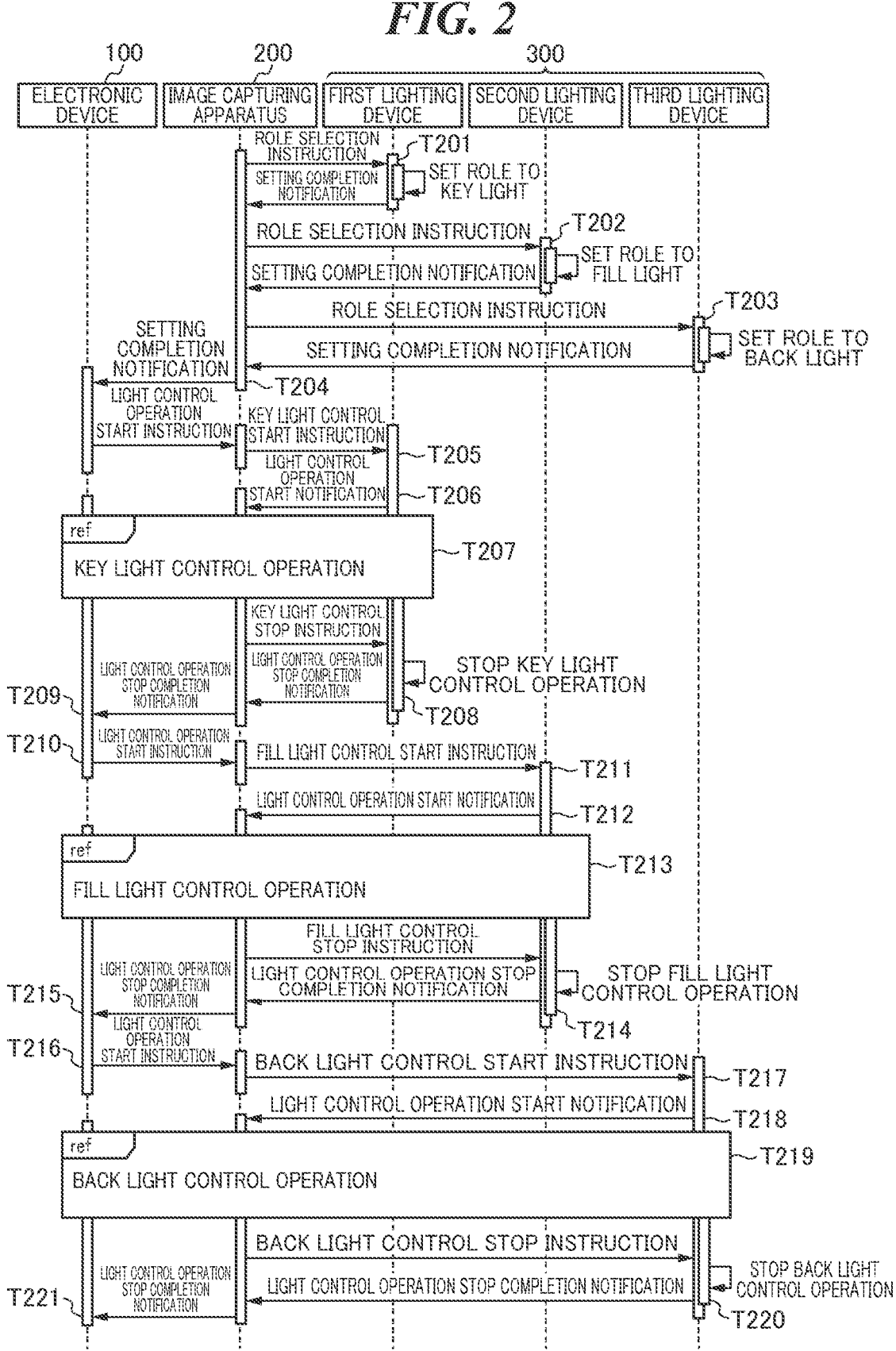
FIG. 2 is a diagram showing light control sequences according to a first embodiment.

FIG. 2 is a diagram showing light control sequences according to the first embodiment, and the following description of the light control sequences will be given by referring to points on a time axis (time points) therein, as T201 to T221.

First, the controller 202 (role setting unit) of the image capturing apparatus 200 sets respective roles of the first to third lighting devices by transmitting a role selection instruction to each of the first to third lighting devices. Referring to FIG. 2, the first lighting device is set to a key light, the second lighting device is set to a fill light, and the third lighting device is set to a back light. The controllers 302 of the first to third lighting devices each perform role setting and then transmit a setting completion notification to the image capturing apparatus 200 (T201 to T203).

At this time, the order of setting these roles is not limited to the order indicated in FIG. 2. For example, the role setting may be performed starting from the fill light or from the back light.

Further, in the first embodiment, the case where the image capturing apparatus 200 transmits the role selection instruction is described by way of example, this is not limitative, but any other means may be used insofar as it is possible to cause each of the first to third lighting devices to perform role setting. For example, a user may perform an operation on each of the first to third lighting devices for setting a role of each lighting device, whereby each lighting device may be caused to perform the role setting according to this operation.

Upon receipt of setting completion notifications from all of the first to third lighting devices, the controller 202 of the image capturing apparatus 200 transmits a setting completion notification to the electronic device 100 (T204). Upon receipt of the setting completion notification from the image capturing apparatus 200, the controller 102 of the electronic device 100 transmits a light control operation start instruction (first light control operation start instruction) to the image capturing apparatus 200 (T205).

Upon receipt of the first light control operation start instruction from the electronic device 100, the controller 202 of the image capturing apparatus 200 transmits a key light control start instruction to the first lighting device having a role set to the key light (T205). Upon receipt of the key light control start instruction from the image capturing apparatus 200, the controller 302 of the first lighting device transmits a light control operation start notification to the image capturing apparatus 200 (T206). Then, a key light control operation is started in the electronic device 100, the image capturing apparatus 200, and the lighting device 300 (T207).

Figure 3B:
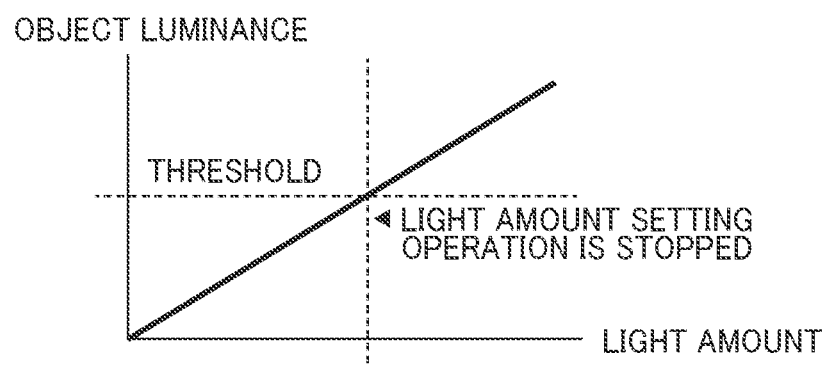
FIG. 3B is a diagram showing a relationship between an object luminance and a light amount, which is exhibited when setting the light amount of a key light.

Details of the key light control operation performed in the electronic device 100, the image capturing apparatus 200, and the lighting device 300 (T207) will be described with reference to FIGS. 3A and 3B. However, the description with reference to FIGS. 3A and 3B is assumed to be given of the operation performed after the image capturing apparatus 200 has received the light control operation start notification (T206) from the first lighting device.

As a simple light control method of the first lighting device (key light), there may be mentioned a method of initially setting the light amount of the light emitting section 303 to a minute amount as an initial value so as to gradually increase the light amount from the initial value, and terminating the light control when an object luminance detected using the image capturing section 203 reaches a proper value. Although in the first embodiment, the description is given assuming that the above-mentioned method is used, by way of example, this is not limitative, but any other method may be employed insofar as it is a method of terminating the light control when an object luminance detected using the image capturing section 203 reaches a proper value.

FIG. 3A is a flowchart of a process performed at T207 in FIG. 2 for executing the key light control operation.

In a step S301, upon receipt of the light control operation start notification from the first lighting device (T206), the controller 202 of the image capturing apparatus 200 starts an operation of detecting a luminance of an object (hereinafter referred to as the "object luminance") from an object image acquired by the image capturing section 203. After that, the controller 202 of the image capturing apparatus 200 keeps the luminance detection operation state. At this time, the controller 202 transmits an object luminance detected at the initial stage of start of the luminance detection operation to the electronic device 100 and causes the controller 102 of the electronic device 100 to store this object luminance detected at the initial stage of start of the luminance detection operation as the initial value.

In a step S302, the controller 302 of the first lighting device (key light) sets the light amount of the light emitting section 303. At this time, in a case where it is immediately after transmission of the light control operation start notification from the first lighting device to the image capturing apparatus 200 (T206), it is desirable that the light amount of the light emitting section 303 is set to a minute amount as the initial setting.

In a step S303, the controller 302 of the first lighting device causes the light emitting section 303 to emit light with the light amount set in the step S302. At this time, the controller 302 of the first lighting device transmits a notification (light emission notification) to the effect that the light emitting section 303 is emitting light with the set light amount to the image capturing apparatus 200.

In a step S304, upon receipt of the light emission notification from the first lighting device, the controller 202 of the image capturing apparatus 200 detects an object luminance using the image capturing section 203.

In a step S305, the controller 202 of the image capturing apparatus 200 transmits the object luminance to the electronic device 100. Thus, by transmitting the first light control operation start instruction to the image capturing apparatus 200, the controller 102 (acquisition unit) of the electronic device 100 acquires the object luminance detected in the step S304 from the image capturing apparatus 200.

In a step S306, the controller 102 of the electronic device 100 determines whether or not the object luminance transmitted from the image capturing apparatus 200 in the step S305 is equal to or higher than a threshold value for key light setting, which is stored in the controller 102.

If it is determined in the step S306 that the object luminance is lower than the threshold value for key light setting (NO to the step S306), the controller 102 of the electronic device 100 transmits a light re-control operation start instruction to the image capturing apparatus 200. Upon receipt of the light re-control operation start instruction, the controller 202 of the image capturing apparatus 200 transmits a key light re-control start instruction to the first lighting device while keeping the luminance detection operation state and then returns to the step S302. With this, the light amount of the light emitting section 303 of the first lighting device is reset to a light amount larger than the light amount currently set by the controller 302 of the first lighting device, according to the key light re-control start instruction. FIG. 3B is a diagram showing a relationship between the object luminance and the light amount, which is exhibited when setting the light amount of the key light.

On the other hand, if it is determined in the step S306 that the object luminance has become equal to or higher than the threshold value for key light setting as shown in FIG. 3B (YES to the step S306), the process proceeds to a step S307.

In the step S307, the controller 102 of the electronic device 100 transmits an instruction for stopping the object luminance detection operation to the image capturing apparatus 200, followed by terminating the present process.

Referring again to FIG. 2, upon receipt of the instruction for stopping the object luminance detection operation from the electronic device 100 (step S307 in FIG. 3A), the controller 202 of the image capturing apparatus 200 stops the luminance detection operation state and transmits a key light control stop instruction to the first lighting device (T208). Upon receipt of the key light control stop instruction from the image capturing apparatus 200, the controller 302 of the first lighting device stops the key light control operation, i.e. the operation of setting the light amount of the light emitting section 303 of the first lighting device (T208). At this time, the controller 302 of the first lighting device may record the light amount of the light emitting section 303 of the first lighting device which is currently emitting light, as the light amount of the proper value for the purpose of saving electric power when performing photographing again.

After stopping the key light control operation, the controller 302 of the first lighting device transmits a light control operation stop completion notification to the image capturing apparatus 200 (T208).

Upon receipt of the light control operation stop completion notification from the first lighting device, the controller 202 of the image capturing apparatus 200 transmits a light control operation stop completion notification to the electronic device 100 (T209).

With the above-described sequence of processing operations, it is possible to control light emission of the first lighting device such that the object has a predetermined object luminance.

Next, upon receipt of the light control operation stop completion notification associated with the first lighting device, the controller 102 of the electronic device 100 transmits a light control operation start instruction (second light control operation start instruction) to the image capturing apparatus 200 (T210).

Upon receipt of the second light control operation start instruction from the electronic device 100 (T210), the controller 202 of the image capturing apparatus 200 transmits a fill light control start instruction to the second lighting device having a role set to the fill light (T211). Note that in the present embodiment, the description is given assuming that the light emitting section 303 of the first lighting device keeps the light emission state with the light amount of the above-mentioned proper value.

Upon receipt of the fill light control start instruction from the image capturing apparatus 200 (T211), the controller 302 of the second lighting device transmits a light control operation start notification to the image capturing apparatus 200 (T212). Then, a fill light control operation is started in the electronic device 100, the image capturing apparatus 200, and the lighting device 300 (T213).

Details of the fill light control operation performed in the electronic device 100, the image capturing apparatus 200, and the lighting device 300 (T213) will be described with reference to FIGS. 4A and 4B. However, the description with reference to FIGS. 4A and 4B is assumed to be given of the operation performed after the image capturing apparatus 200 has received the light control operation start notification (T212) from the second lighting device.

As a simple light control method of the second lighting device (fill light), there may be mentioned a method of initially setting the light amount of the light emitting section 303 to a minute amount as an initial value so as to gradually increase the light amount from the initial value, and terminating the light control when a shadow contrast value of an object detected using the image capturing section 203 reaches a proper value. Although in the first embodiment, the description is given assuming that the above-mentioned method is used, by way of example, this is not limitative, but any other method may be employed insofar as it is a method of terminating the light control when a shadow contrast value detected using the image capturing section 203 reaches a proper value.

Figure 4A:
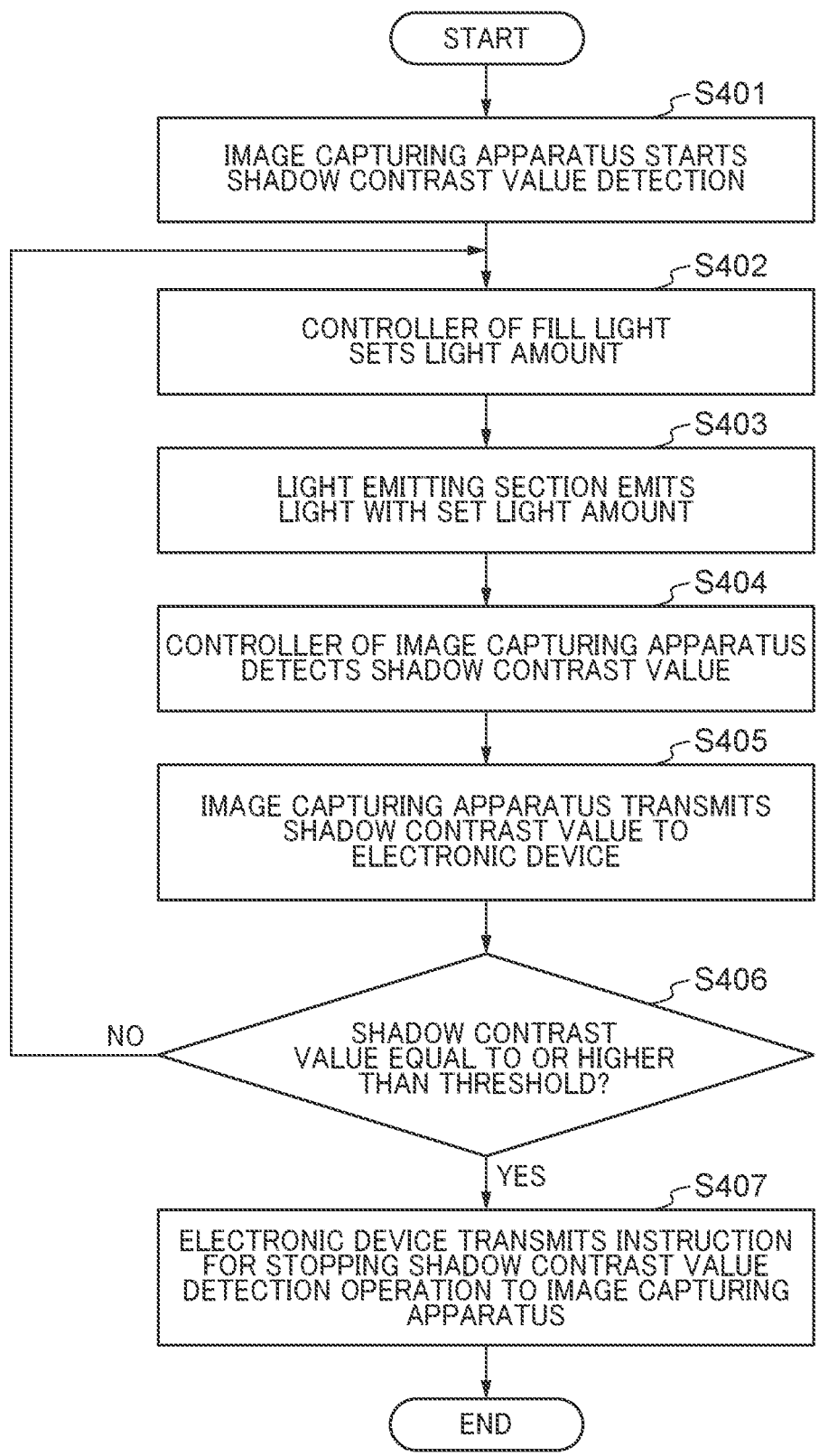
FIG. 4A is a flowchart of a process performed at T213 in FIG. 2 for executing a fill light control operation.
Figure 4B:
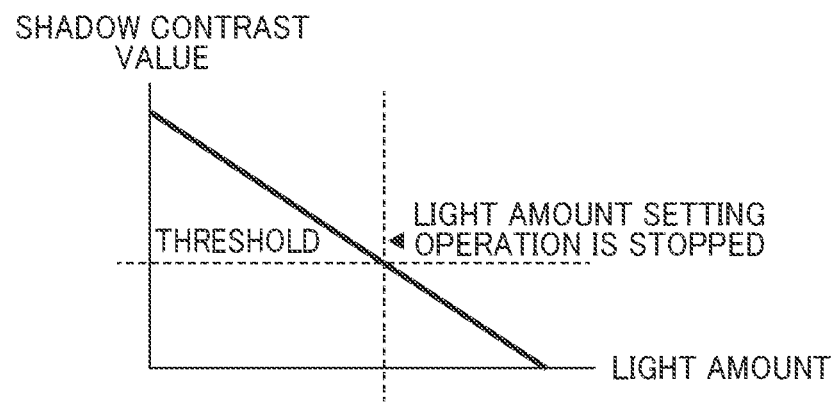
FIG. 4B is a diagram showing a relationship between a shadow contrast value and a light amount, which is exhibited when setting the light amount of a fill light.

FIG. 4A is a flowchart of a process for executing the fill light control operation performed at T213 in FIG. 2.

In a step S401, upon receipt of the light control operation start notification from the second lighting device (T212), the controller 202 of the image capturing apparatus 200 starts an operation of detecting a shadow contrast value of the object from the object image acquired by the image capturing section 203. After that, the controller 202 of the image capturing apparatus 200 keeps the shadow contrast value detection operation state. At this time, the controller 202 transmits the shadow contrast value detected at the initial stage of start of the shadow contrast detection operation to the electronic device 100 and causes the controller 102 of the electronic device 100 to store this shadow contrast value detected at the initial stage of start of the shadow contrast detection operation as the initial value.

The setting of a detection range of an object shadow part, performed by the controller 202 at this time, can be realized e.g. by making full use of pupil detection, and for example, a position of a nose below pupils is set as the detection range. With this, it is possible to execute light control with respect to a shadow formed on the object by light emission from the light emitting section 303 of the first lighting device.

However, the above-mentioned method is an example of the method of detecting a shadow on an object, and the detection range of the object shadow part is not limited to the above-mentioned specific range.

In a step S402, the controller 302 of the second lighting device (fill light) sets an amount of light emission from the light emitting section 303. At this time, in a case where it is immediately after transmission of the light control operation start notification from the second lighting device to the image capturing apparatus 200 (T212), it is desirable that the light amount of the light emitting section 303 is set to a minute amount as the initial setting.

In a step S403, the controller 302 of the second lighting device causes the light emitting section 303 to emit light with the light amount set in the step S402. At this time, the controller 302 of the second lighting device transmits a notification (light emission notification) to the effect that the light emitting section 303 is emitting light with the set light amount to the image capturing apparatus 200.

In a step S404, upon receipt of the light emission notification from the second lighting device, the controller 202 of the image capturing apparatus 200 detects a shadow contrast value using the image capturing section 203.

In a step S405, the controller 202 of the image capturing apparatus 200 transmits the shadow contrast value detected in the step S404 to the electronic device 100. That is, by transmitting the second light control operation start instruction to the image capturing apparatus 200 (T210), the controller 102 (acquisition unit) of the electronic device 100 acquires the shadow contrast value detected in the step S404 from the image capturing apparatus 200.

In a step S406, the controller 102 of the electronic device 100 determines whether or not the shadow contrast value transmitted from the image capturing apparatus 200 in the step S405 is equal to or higher than a threshold value for fill light setting, which is stored in the controller 102.

If it is determined in the step S406 that the shadow contrast value is lower than the threshold value for fill light setting (NO to the step S406), the controller 102 of the electronic device 100 transmits a light re-control operation start instruction to the image capturing apparatus 200. Upon receipt of the light re-control operation start instruction, the controller 202 of the image capturing apparatus 200 transmits a fill light re-control start instruction to the second lighting device while keeping the shadow contrast value detection operation state and then returns to the step S402. With this, the light amount of the light emitting section 303 of the second lighting device is reset to a light amount larger than the light amount currently set by the controller 302 of the second lighting device, according to the fill light re-control start instruction. FIG. 4B is a diagram showing a relationship between the shadow contrast value and the light amount, which is exhibited when setting the light amount of the fill light.

On the other hand, if it is determined in the step S406 that the shadow contrast value has become equal to or higher than the threshold value for fill light setting (YES to the step S406) as shown in FIG. 4B, the process proceeds to a step S407.

In the step S407, the controller 102 of the electronic device 100 transmits an instruction for stopping the shadow contrast value detection operation to the image capturing apparatus 200, followed by terminating the present process.

Referring again to FIG. 2, upon receipt of the instruction for stopping the shadow contrast value detection operation from the electronic device 100 (step S407 in FIG. 4A), the controller 202 of the image capturing apparatus 200 stops the shadow contrast value detection operation state and transmits a fill light control stop instruction to the second lighting device (T214). Upon receipt of the fill light control stop instruction from the image capturing apparatus 200, the controller 302 of the second lighting device stops the fill light control operation, i.e. the operation of setting the light amount of the light emitting section 303 of the second lighting device (T214). At this time, the controller 302 of the second lighting device may record the light amount of the light emitting section 303 of the second lighting device which is currently emitting light, as the light amount of the proper value for the purpose of saving electric power when performing photographing again.

After stopping the fill light control operation, the controller 302 of the second lighting device transmits a light control operation stop completion notification to the image capturing apparatus 200 (T214).

Upon receipt of the light control operation stop completion notification from the second lighting device, the controller 202 of the image capturing apparatus 200 transmits a light control operation stop completion notification to the electronic device 100 (T215).

With the above-described sequence of processing operations, it is possible to control light emission of the second lighting device such that a shadow formed by light emission from the first lighting device is reduced.

Next, upon receipt of the light control operation stop completion notification associated with the second lighting device, the controller 102 of the electronic device 100 transmits a light control operation start instruction (third light control operation start instruction) to the image capturing apparatus 200 (T216).

Upon receipt of the third light control operation start instruction from the electronic device 100 (T216), the controller 202 of the image capturing apparatus 200 transmits a back light control start instruction to the third lighting device having a role set to the back light (T217). Note that in the present embodiment, the description is given assuming that the light emitting section 303 of the first lighting device and the light emitting section 303 of the second lighting device keep light emission with the light amounts of the above-mentioned respective proper values.

Upon receipt of the back light control start instruction from the image capturing apparatus 200 (T217), the controller 302 of the third lighting device transmits a light control operation start notification to the image capturing apparatus 200 (T218). Then, a back light control operation is started in the electronic device 100, the image capturing apparatus 200, and the lighting device 300 (T219).

Details of the back light control operation (T219) performed in the electronic device 100, the image capturing apparatus 200, and the lighting device 300 will be described with reference to FIGS. 5A and 5B. However, the description with reference to FIGS. 5A and 5B is assumed to be given of the operation performed after the image capturing apparatus 200 has received the light control operation start notification (T218) from the third lighting device.

As a simple light control method of the third lighting device (back light), there may be mentioned a method of initially setting the light amount of the light emitting section 303 to a minute amount as an initial value so as to gradually increase the light amount from the initial value, and terminating the light control when an outline contrast value of an object detected using the image capturing section 203 reaches a proper value. Although in the first embodiment, the description is given assuming that the above-mentioned method is used, by way of example, this is not limitative, but any other method may be employed insofar as it is a method of terminating the light control when an outline contrast value detected using the image capturing section 203 reaches a proper value.

Figure 5A:
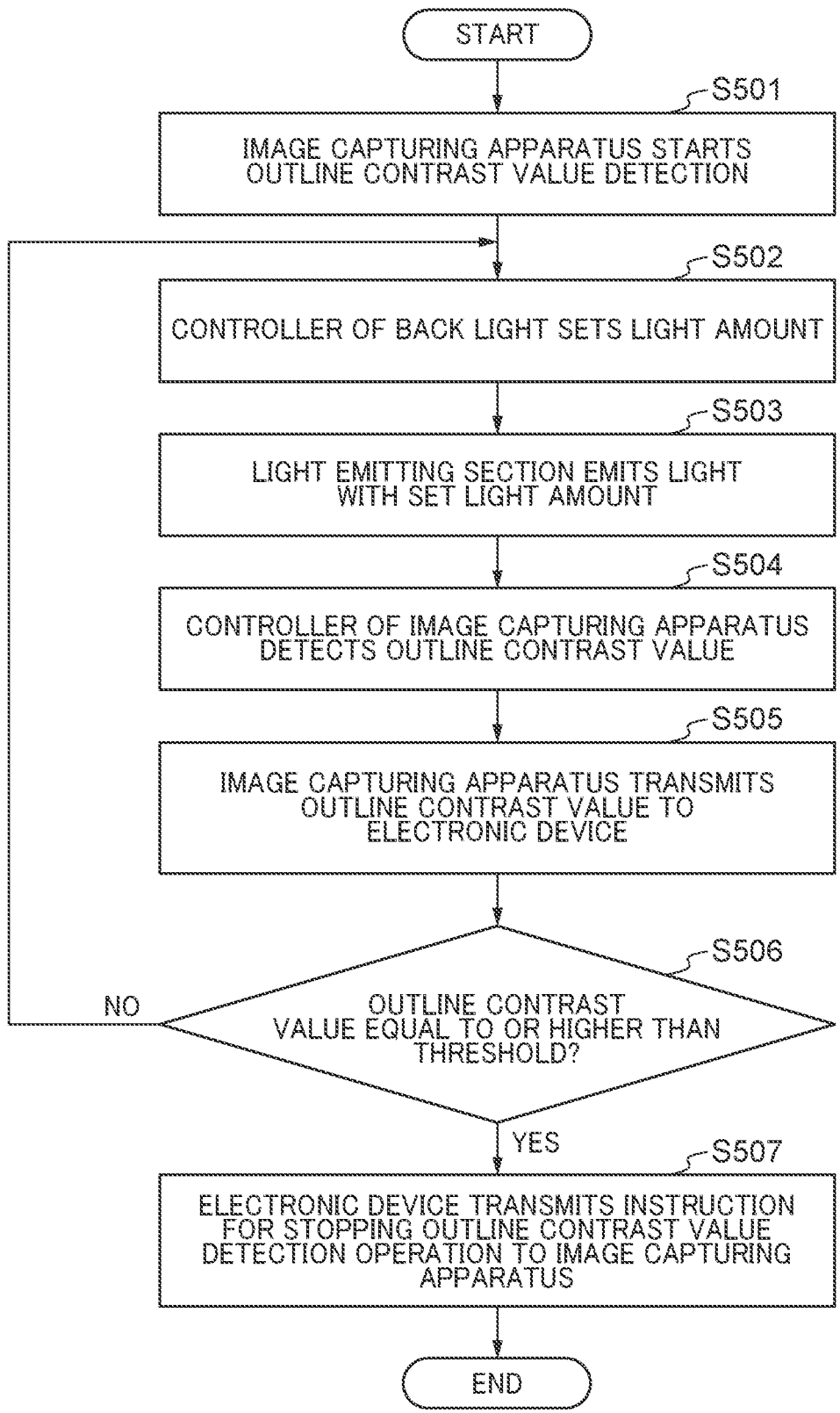
FIG. 5A is a flowchart of a process performed at T219 in FIG. 2 for executing a back light control operation.
Figure 5B:
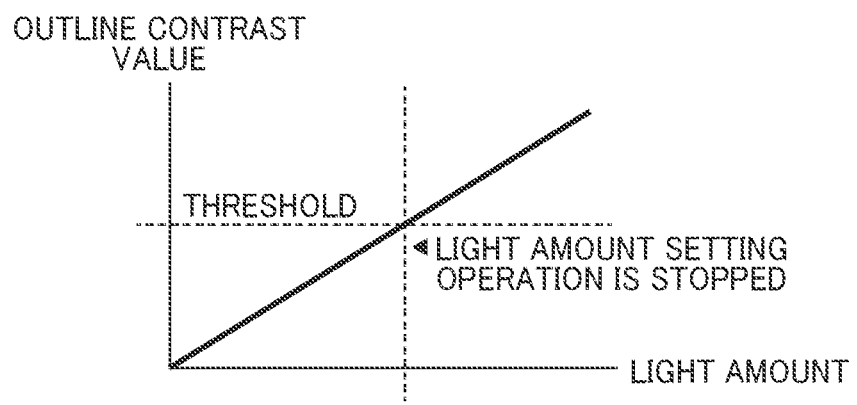
FIG. 5B is a diagram showing a relationship between an outline contrast value and a light amount, which is exhibited when setting the light amount of a back light.

FIG. 5A is a flowchart of a process for executing the back light control operation performed at T219 in FIG. 2.

In a step S501, upon receipt of the light control operation start notification from the third lighting device (T218), the controller 202 of the image capturing apparatus 200 starts an operation of detecting an outline contrast value of the object from the object image acquired by the image capturing section 203. After that, the controller 202 of the image capturing apparatus 200 keeps the outline contrast value detection operation state. At this time, the controller 202 transmits the outline contrast value detected at the initial stage of start of the outline contrast detection operation to the electronic device 100 and causes the controller 102 of the electronic device 100 to store this outline contrast value detected at the initial stage of start of the outline contrast detection operation as the initial value.

The setting of a detection range of an object outline part, performed by the controller 202 at this time, can be realized e.g. by making full use of object distance information, and for example, change points of the distance information obtained by the image capturing section 203 are set to a perimeter of the detection range. With this, it is possible to detect an outline of an object, which is formed by light emission from the light emitting section 303 of the third lighting device.

However, the above-mentioned method is an example of the method of detecting an outline of an object, and the detection method is not limited to the above-mentioned specific detection method.

In a step S502, the controller 302 of the third lighting device (back light) sets an amount of light emission from the light emitting section 303. At this time, in a case where it is immediately after transmission of the light control operation start notification from the third lighting device to the image capturing apparatus 200 (T218), it is desirable that the light amount of the light emitting section 303 is set to a minute amount as the initial setting.

In a step S503, the controller 302 of the third lighting device causes the light emitting section 303 to emit light with the light amount set in the step S502. At this time, the controller 302 of the third lighting device transmits a notification (light emission notification) to the effect that the light emitting section 303 is emitting light with the set light amount to the image capturing apparatus 200.

In a step S504, upon receipt of the light emission notification from the third lighting device, the controller 202 of the image capturing apparatus 200 detects an outline contrast value using the image capturing section 203.

In a step S505, the controller 202 of the image capturing apparatus 200 transmits the outline contrast value detected in the step S504 to the electronic device 100. That is, by transmitting the third light control operation start instruction to the image capturing apparatus 200 (T216), the controller 102 (acquisition unit) of the electronic device 100 acquires the outline contrast value detected in the step S504 from the image capturing apparatus 200.

In a step S506, the controller 102 of the electronic device 100 determines whether or not the outline contrast value transmitted from the image capturing apparatus 200 in the step S505 is equal to or higher than a threshold value for back light setting, which is stored in the controller 102.

If it is determined in the step S506 that the outline contrast value is lower than the threshold value for back light setting (NO to the step S506), the controller 102 of the electronic device 100 transmits a light re-control operation start instruction to the image capturing apparatus 200. Upon receipt of the light re-control operation start instruction, the controller 202 of the image capturing apparatus 200 transmits a back light re-control start instruction to the third lighting device while keeping the outline contrast value detection operation state and then returns to the step S502. With this, the light amount of the light emitting section 303 of the third lighting device is reset to a light amount larger than the light amount currently set by the controller 302 of the third lighting device, according to the back light re-control start instruction. FIG. 5B is a diagram showing a relationship between the outline contrast value and the light amount, which is exhibited when setting the light amount of the back light.

On the other hand, if it is determined in the step S506 that the outline contrast value has become equal to or higher than the threshold value for back light setting (YES to the step S506) as shown in FIG. 5B, the process proceeds to a step S507.

In the step S507, the controller 102 of the electronic device 100 transmits an instruction for stopping the outline contrast value detection operation to the image capturing apparatus 200, followed by terminating the present process.

Referring again to FIG. 2, upon receipt of the instruction for stopping the outline contrast value detection operation from the electronic device 100 (step S507), the image capturing apparatus 200 stops the outline contrast value detection operation state and transmits a back light control stop instruction to the third lighting device (T220). Upon receipt of the back light control stop instruction from the image capturing apparatus 200, the controller 302 of the third lighting device stops the back light control operation, i.e. the operation of setting the light amount of the light emitting section 303 of the third lighting device (T220). At this time, the controller 302 of the third lighting device may record the light amount of the light emitting section 303 of the third lighting device which is currently emitting light, as the light amount of the proper value for the purpose of saving electric power when performing photographing again.

After stopping the back light-role operation, the controller 302 of the second lighting device transmits a light control operation stop completion notification to the image capturing apparatus 200 (T220).

Upon receipt of the light control operation stop completion notification from the third lighting device, the controller 202 of the image capturing apparatus 200 transmits a light control operation stop completion notification to the electronic device 100 (T221).

With the above-described sequence of processing operations, it is possible to control light emission of the third lighting device, by taking into consideration the total light amount of the first lighting device and the second lighting device, such that the outline of the object stands out.

As described above, it is possible to provide the light control method based on an actually acquired video, by using the first to third lighting devices having roles set according to respective uses, and the image capturing apparatus 200 that executes the light control according to each role.

Although in the first embodiment, the configuration has been described, by way of example, in which the light emission state of the first lighting device is kept when the light control of the second lighting device is performed, and the light emission states of the first and second lighting devices are kept when the light control of the third lighting device is performed, this is not limitative.

For example, a method may be employed, in which the first to third lighting devices each perform the light emission operation at least twice, and the light control is performed by calculating a proper light amount based on a difference between each of the luminance, the shadow, and the contrast information, obtained when light is emitted, and an associated proper value. By using this method, it is possible to perform the light control by saving more electric power.

Further, although in the first embodiment, the three-point photography is assumed as a preferable configuration of photography, and photographing is performed using light from the three lights of the first to third lighting devices, by way of example, the present invention can also be practiced within the scope thereof when photographing using light from two lights.

A second embodiment of the present invention will be described below with reference to FIGS. 6 and 7.

In the second embodiment, the light control of the lighting device 300 is all performed by the controller 202 of the image capturing apparatus 200. That is, as indicated by a light control system 1a shown in FIG. 6, out of the light control system 1 shown in FIG. 1, only the image capturing apparatus 200 and the lighting device 300 are used in the second embodiment.

Further, similar to the first embodiment, in the second embodiment as well, the case will be described where light control in three-point photography, as a generally employed configuration of photography, is performed. That is, similar to the first embodiment, in the second embodiment as well, the case where the first to three lighting devices exist as the lighting device 300 connected to the image capturing apparatus 200 will be described. In the following description, the lighting device 300 will be used as the general term for the first to third lighting devices.

Figure 6:
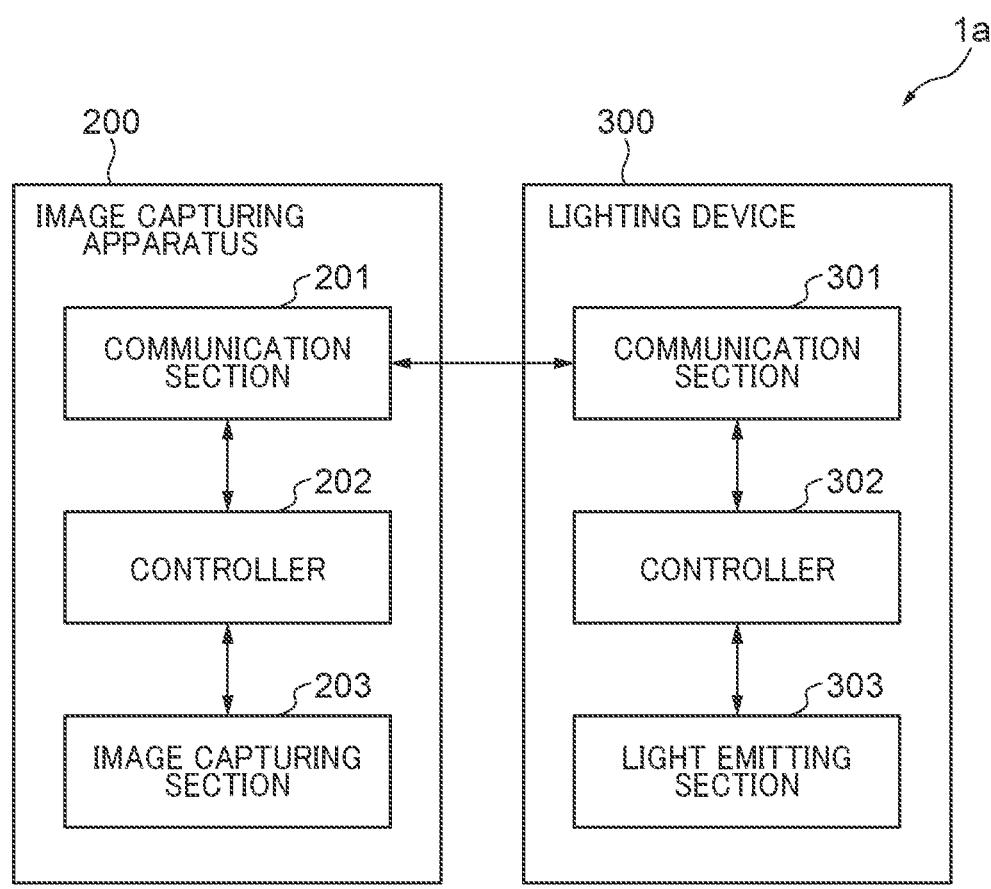
FIG. 6 is a diagram showing the entire configuration of a light control system according to a second embodiment.

Referring to FIG. 6, the light control system 1a includes the image capturing apparatus 200 and the lighting device 300 that is capable of communicating with the image capturing apparatus 200.

The image capturing apparatus 200 includes the communication section 201, the controller 202, and the image capturing section 203.

The lighting device 300 includes the communication section 301, the controller 302, and the light emitting section 303.

First, the image capturing apparatus 200 will be described.

The communication section 201 (first communication unit) is communicably connected to the communication section 301 of the lighting device 300. Although in FIG. 6, the communication section 201 is wired connected to the communication section 301, this is not limitative, but the communication section 201 may be wirelessly connected.

The image capturing section 203 includes the image sensor and acquires an object image. The controller 202 (detection unit) detects at least one information of an object luminance, a shadow contrast value, and an outline contrast value from the object image acquired by the image capturing section 203. Although in FIG. 6, the image capturing apparatus 200 incorporates the one controller 202, the number of incorporated controllers 202 is not limited to one. For example, the image capturing apparatus 200 may be configured to include a plurality of controllers 202, and the controllers 202 may respectively detect an object luminance, a shadow contrast value, and an outline contrast value from the object image acquired by the image capturing section 203.

Further, the controller 202 (light control unit) performs light control of the lighting device 300 via the communication section 201, based on a role of the lighting device 300 and at least one information of an object luminance, a shadow contrast value, and an outline contrast value.

Next, the lighting device 300 will be described.

The communication section 301 (second communication unit) is communicably connected to the communication section 201 of the image capturing apparatus 200. Although in FIG. 6, the communication section 301 is wired connected to the communication section 201, this is not limitative, but the communication section 301 may be wirelessly connected.

The controller 302 holds information indicative of the role of the lighting device 300 and light emission operation information associated with this role. Further, the controller 302 (light amount-setting unit) sets, when a user performs an operation for setting the role of the lighting device 300 or when a role instruction is received from the image capturing apparatus 200, a light amount of the light emitting section 303 according to the set or instructed role, and executes a light emission operation. Note that the role information of the lighting device 300 is not limitatively stored in the controller 302 of the lighting device 300, but for example, may be stored in the controller 202 of the image capturing apparatus 200.

In a case where the above-mentioned configuration is employed, the lighting device 300 executes the light emission operation associated with the role according to a control instruction from the controller 202.

The light emitting section 303 is a light source that emits light under the control of the controller 302.

Figure 7:
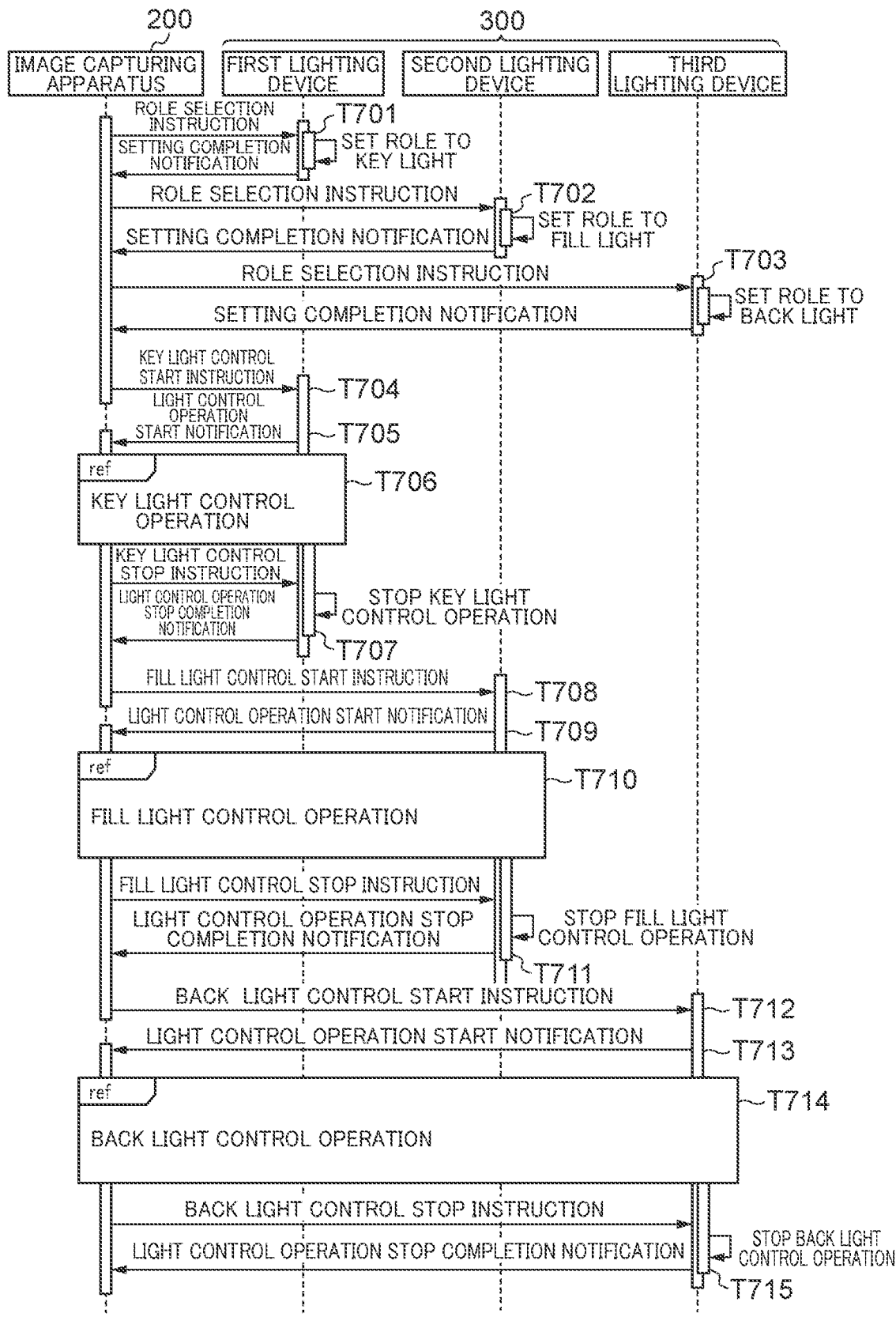
FIG. 7 is a diagram showing light control sequences according to the second embodiment.

FIG. 7 is a diagram showing light control sequences according to the second embodiment, and the following description of the light control sequences will be given by referring to points on a time axis (time points) therein, as T701 to T7151.

First, the controller 202 (role setting unit) of the image capturing apparatus 200 sets respective roles of the first to third lighting devices by transmitting a role selection instruction to each of the first to third lighting devices. Referring to FIG. 7, the first lighting device is set to a key light, the second lighting device is set to a fill light, and the third lighting device is set to a back light. The controllers 302 of the first to third lighting devices each perform role setting and then transmit a setting completion notification to the image capturing apparatus 200 (T701 to T703).

At this time, the order of setting these roles is not limited to the order indicated in FIG. 7. For example, the role setting may be performed starting from the fill light or from the back light.

Further, in the second embodiment, the case where the image capturing apparatus 200 transmits the role selection instruction is described by way of example, this is not limitative, but any other means may be used insofar as it is possible to cause each of the first to third lighting devices to perform role setting. For example, a user may perform an operation on each of the first to third lighting devices for setting a role of each lighting device, whereby each lighting device may be caused to perform the role setting according to this operation.

Upon receipt of the setting completion notifications from all of the first to third lighting devices, the controller 202 of the image capturing apparatus 200 transmits a key light control start instruction to the first lighting device having a role set to the key light (T704).

Upon receipt of the key light control start instruction from the image capturing apparatus 200, the controller 302 of the first lighting device transmits a light control operation start notification to the image capturing apparatus 200 (T705). Then, the key light control operation is started in the image capturing apparatus 200 and the lighting device 300 (T706).

Details of the key light control operation (T706) performed in the image capturing apparatus 200 and the lighting device 300 are equivalent to the process shown in FIG. 3A, and hence this operation will be described with reference to FIGS. 3A and 3B. The key light control operation in the second embodiment differs from that in the first embodiment in that the control performed by the controller 102 of the electronic device 100 is performed by the controller 202 of the image capturing apparatus 200.

More specifically, the same processing operations as those in the first embodiment are executed in the steps S301 to S304, and the controller 202 of the image capturing apparatus 200 acquires an object luminance. Note that differently from the first embodiment, in the second embodiment, the determination processing in the step S306 is performed in the image capturing apparatus 200, and hence the process directly proceeds from the step S304 to the step S306 without performing the processing for transmitting the object luminance in the step S305.

In the step S306, the controller 102 of the electronic device 100 determines whether or not the acquired object luminance is equal to or higher than the threshold value for key light setting. Note that differently from the first embodiment, the threshold value for key light setting is stored in the controller 202 of the image capturing apparatus 200, and the determination processing in the step S306 is executed by the controller 202 of the image capturing apparatus 200.

If it is determined in the step S306 that the acquired object luminance is lower than the threshold value for key light setting (NO to the step S306), the controller 202 of the image capturing apparatus 200 transmits a key light re-control start instruction to the first lighting device while keeping the luminance detection operation state. Then, the process returns to the step S302. With this, the light amount of the light emitting section 303 of the first lighting device is reset to a light amount larger than the light amount currently set by the controller 302 of the first lighting device, according to the key light re-control start instruction.

On the other hand, if it is determined in the step S306 that the object luminance has become equal to or higher than the threshold value for key light setting (YES to the step S306) as shown in FIG. 3B, differently from the first embodiment, the present process is immediately terminated without proceeding to the step S307.

Referring again to FIG. 7, when the key light control operation (T706) is terminated, the controller 202 of the image capturing apparatus 200 stops the luminance detection operation state and transmits a key light control stop instruction to the first lighting device (T707). Upon receipt of the key light control stop instruction from the image capturing apparatus 200, the controller 302 of the first lighting device stops the key light control operation, i.e. the operation of setting the light amount of the light emitting section 303 of the first lighting device (T707). At this time, the controller 302 of the first lighting device may record the light amount of the light emitting section 303 of the first lighting device which is currently emitting light, as the light amount of the proper value for the purpose of saving electric power when performing photographing again.

After stopping the key light control operation, the controller 302 of the first lighting device transmits a light control operation stop completion notification to the image capturing apparatus 200 (T707).

Upon receipt of the light control operation stop completion notification from the first lighting device, the controller 202 of the image capturing apparatus 200 transmits a fill light control start instruction to the second lighting device having a role set to the fill light (T708). Note that in the present embodiment, the description is given assuming that the light emitting section 303 of the first lighting device keeps the light emission state with the above-mentioned proper value.

Upon receipt of the fill light control start instruction from the image capturing apparatus 200, the controller 302 of the second lighting device transmits a light control operation start notification to the image capturing apparatus 200 (T709). Then, the fill light control operation is started in the image capturing apparatus 200 and the lighting device 300 (T710).

Details of the fill light control operation performed in the image capturing apparatus 200 and the lighting device 300 (T710) are equivalent to the process shown in FIG. 4A, and hence this operation will be described with reference to FIGS. 4A and 4B. The fill light control operation in the second embodiment differs from that in the first embodiment in that the control performed by the controller 102 of the electronic device 100 is performed by the controller 202 of the image capturing apparatus 200.

More specifically, the same processing operations as those in the first embodiment are executed in the steps S401 to S404, and the controller 202 of the image capturing apparatus 200 acquires a shadow contrast value. Note that differently from the first embodiment, in the second embodiment, the determination processing in the step S406 is performed in the image capturing apparatus 200, and hence the process directly proceeds from the step S404 to the step S406 without performing the processing for transmitting the shadow contrast value in the step S405.

In the step S406, the controller 202 of the image capturing apparatus 200 determines whether or not the acquired shadow contrast value is equal to or higher than the threshold value for fill light setting. Note that differently from the first embodiment, the threshold value for fill light setting is stored in the controller 202 of the image capturing apparatus 200, and the determination processing in the step S406 is executed by the controller 202 of the image capturing apparatus 200.

If it is determined that the acquired shadow contrast value is lower than the threshold value for fill light setting (NO to the step S406), the controller 202 of the image capturing apparatus 200 transmits a fill light re-control start instruction to the second lighting device while keeping the shadow contrast value detection operation state. Then, the process returns to the step S402. With this, the light amount of the light emitting section 303 of the second lighting device is reset to a light amount larger than the light amount currently set by the controller 302 of the second lighting device, according to the fill light re-control start instruction.

On the other hand, if it is determined in the step S406 that the shadow contrast value has become equal to or higher than the threshold value for fill light setting (YES to the step S406) as shown in FIG. 4B, differently from the first embodiment, the present process is immediately terminated without proceeding to the step S407.

Referring again to FIG. 7, when the fill light control operation (T710) is terminated, the controller 202 of the image capturing apparatus 200 stops the shadow contrast value detection operation state and transmits a fill light control stop instruction to the second lighting device (T711). Upon receipt of the fill light control stop instruction from the image capturing apparatus 200, the controller 302 of the second lighting device stops the fill light control operation, i.e. the operation of setting the light amount of the light emitting section 303 of the second lighting device (T711). At this time, the controller 302 of the second lighting device may record the light amount of the light emitting section 303 of the second lighting device which is currently emitting light, as the light amount of the proper value for the purpose of saving electric power when performing photographing again.

After stopping the fill light control operation, the controller 302 of the second lighting device transmits a light control operation stop completion notification to the image capturing apparatus 200 (T711).

Upon receipt of the light control operation stop completion notification from the second lighting device, the controller 202 of the image capturing apparatus 200 transmits a back light control start instruction to the third lighting device having a role set to the back light (T712). Note that in the present embodiment, the description is given assuming that the light emitting section 303 of the first lighting device and the light emitting section 303 of the second lighting device keep light emission with the light amounts of the above-mentioned respective proper values.

Upon receipt of the back light control start instruction from the image capturing apparatus 200, the controller 302 of the third lighting device transmits a light control operation start notification to the image capturing apparatus 200 (T713). Then, the back light control operation is started in the image capturing apparatus 200 and the lighting device 300 (T714).

Details of the back light control operation performed in the image capturing apparatus 200 and the lighting device 300 (T714) are equivalent to the process shown in FIG. 5A, and hence this operation will be described with reference to FIGS. 5A and 5B. The back light control operation in the second embodiment differs from that in the first embodiment in that the control performed by the controller 102 of the electronic device 100 is performed by the controller 202 of the image capturing apparatus 200.

More specifically, the same processing operations as those in the first embodiment are executed in the steps S501 to S504, and the controller 202 of the image capturing apparatus 200 acquires an outline contrast value. Note that differently from the first embodiment, in the second embodiment, the determination processing in the step S506 is performed in the image capturing apparatus 200, and hence the process directly proceeds from the step S504 to the step S506 without performing the processing for transmitting the outline contrast value in the step S505.

In the step S506, the controller 202 of the image capturing apparatus 200 determines whether or not the acquired outline contrast value is equal to or higher than the threshold value for back light setting. Note that differently from the first embodiment, the threshold value for back light setting is stored in the controller 202 of the image capturing apparatus 200, and the determination processing in the step S506 is executed by the controller 202 of the image capturing apparatus 200.

If it is determined that the acquired outline contrast value is lower than the threshold value for back light setting (NO to the step S506), the controller 202 of the image capturing apparatus 200 transmits a back light re-control start instruction to the third lighting device while keeping the outline contrast value detection operation state. Then, the process returns to the step S502. With this, the light amount of the light emitting section 303 of the third lighting device is reset to a light amount larger than the light amount currently set by the controller 302 of the third lighting device, according to the back light re-control start instruction.

On the other hand, if it is determined in the step S506 that the outline contrast value has become equal to or higher than the threshold value for back light setting (YES to the step S506) as shown in FIG. 5B, differently from the first embodiment, the present process is immediately terminated without proceeding to the step S507.

Referring again to FIG. 7, when the back light control operation (T714) is terminated, the controller 202 of the image capturing apparatus 200 stops the outline contrast detection operation state and transmits a back light control stop instruction to the third lighting device (T715). Upon receipt of the back light control stop instruction from the image capturing apparatus 200, the controller 302 of the third lighting device stops the back light control operation, i.e. the operation of setting the light amount of the light emitting section 303 of the third lighting device (T715). At this time, the controller 302 of the third lighting device may record the light amount of the light emitting section 303 of the third lighting device which is currently emitting light, as the light amount of the proper value for the purpose of saving electric power when performing photographing again.

After stopping the back light control operation, the controller 302 of the third lighting device transmits a light control operation stop completion notification to the image capturing apparatus 200 (T715).

With the above-described sequence of processing operations, it is possible to control light emission of the third lighting device, by taking into consideration the total light amount of the first lighting device and the second lighting device, such that the outline of the object stands out.

As described above, it is possible to provide the light control method based on an actually acquired video, by using the first to third lighting devices having roles set according to respective uses, and the image capturing apparatus 200 that executes the light control according to each role.

Although in the second embodiment, the configuration has been described by way of example, in which the light emission state of the first lighting device is kept when the light control of the second lighting device is performed, and the light emission states of the first and second lighting devices are kept when the light control of the third lighting device is performed, this is not limitative.

For example, a method may be employed, in which the first to third lighting devices each perform the light emission operation at least twice, and the light control is performed by calculating a proper light amount based on a difference between each of the luminance, the shadow, and the contrast information, obtained when light is emitted, and an associated proper value. By using this method, it is possible to perform the light control by saving more electric power.

Further, although in the second embodiment, the three-point photography is assumed as a preferable configuration of photography, and photographing is performed using light from the three lights of the first to third lighting devices, by way of example, the present invention can also be practiced within the scope thereof when photographing using light from two lights.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-048667 filed Mar. 24, 2022, which is hereby incorporated by reference herein in its entirety.

What is claimed is:

1. A light control system that includes an image capturing apparatus having an image capturing section for acquiring an image of an object, and a plurality of lighting devices each having a light emitting section, comprising:
at least one processor that executes respective functions of:
a detection unit configured to detect at least two types of information, among an object luminance, a shadow contrast value, and an outline contrast value, from the image of the object acquired by the image capturing section;
a light amount-setting unit configured to set a light amount of the light emitting section of each of the lighting devices; and a light control unit configured to perform light control of the lighting devices according to the information detected by the detection unit and a role of the lighting devices, wherein the lighting devices include at least two roles among key light, fill light, and back light, with each lighting device assigned a single role;

the detection unit detects the information according to the roles of the lighting devices;

the key light is configured to adjust lighting such that the object achieves a predetermined luminance level;

the fill light is configured to fill in shadows created by the key light; and the back light is configured to cause an outline of the object to stand out.

2. The light control system according to claim 1, wherein the at least one processor further has a function of a role setting unit configured to set the role to the lighting devices.

3. The light control system according to claim 1, including a light control device different from the image capturing apparatus and the lighting devices, and wherein at least one processor of the light control device has a function of the light control unit.

4. The light control system according to claim 3, wherein at least one processor of the image capturing apparatus has a function of a first communication unit configured to perform wired communication or wireless communication with the lighting devices and the light control device, wherein at least one processor of the lighting devices has a function of a second communication unit configured to perform wired communication or wireless communication with the image capturing apparatus, and wherein the at least one processor of the light control device further has a function of a third communication unit configured to perform wired communication or wireless communication with the image capturing apparatus.

5. The light control system according to claim 1, wherein in a case where one of the lighting devices is assigned the role of the key light, when the object luminance detected by the detection unit reaches a threshold value set in advance according to the role of the key light, the light control unit terminates the light control of the key light.

6. The light control system according to claim 5, wherein in a case where one of the lighting devices is assigned the role of the fill light, when the shadow contrast value detected by the detection unit reaches a threshold value set in advance according to the role of the fill light, the light control unit terminates the light control of the fill light.

7. The light control system according to claim 1, wherein in a case where one of the lighting devices is assigned the role of the back light, when the outline contrast value detected by the detection unit reaches a threshold value set in advance according to the role of the back light, the light control unit terminates the light control of the back light.

8. A light control device that performs light control of a plurality of lighting devices each having a light emitting section, by using an image of an object, which is acquired by an image capturing section for acquiring the image of the object, comprising:

at least one processor that executes respective functions of:

an acquisition unit configured to acquire at least two types of information, among an object luminance, a shadow contrast value, and an outline contrast value, detected from the image of the object acquired by the image capturing section; and a light control unit configured to perform light control of the lighting devices according to the information acquired by the acquisition unit and a role of the lighting devices, wherein the lighting devices include at least two roles among key light, fill light, and back light, with each lighting device assigned a single role;

the key light is configured to adjust lighting such that the luminance level of the object achieves a predetermined value;

the fill light is configured to fill in shadows created by the key light; and the back light is configured to cause an outline of the object to stand out.

9. The light control device according to claim 8, wherein the light control device is an image capturing apparatus that includes the image capturing section and performs communication with the lighting devices.

10. A method of controlling a light control device that performs light control of a plurality of lighting devices each having a light emitting section, by using an image of an object, which is acquired by an image capturing section for acquiring the image of the object, comprising:

acquiring at least two types of information, among an object luminance, a shadow contrast value, and an outline contrast value, detected from the image of the object acquired by the image capturing section; and performing light control of the lighting devices according to the acquired information and a role of the lighting devices, wherein the lighting devices include at least two roles among key light, fill light, and back light, with each lighting device assigned a single role;

the key light is configured to adjust lighting such that the luminance level of the object achieves a predetermined value;

the fill light is configured to fill in shadows created by the key light; and the back light is configured to cause an outline of the object to stand out.

\* \* \* \* \*